United States Patent
Uchiyama (10) Patent No.: US 11,950,028 B2
(45) Date of Patent: Apr. 2, 2024

(54) METHOD OF CONTROLLING PROJECTOR AND PROJECTOR

(71) Applicant: SEIKO EPSON CORPORATION, Tokyo (JP)

(72) Inventor: Yoshiteru Uchiyama, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/956,340

(22) Filed: Sep. 29, 2022

(65) Prior Publication Data

US 2023/0101765 A1    Mar. 30, 2023

(30) Foreign Application Priority Data

Sep. 30, 2021  (JP) ................. 2021-160691

(51) Int. Cl.
*H04N 9/31*    (2006.01)
(52) U.S. Cl.
CPC ......... *H04N 9/3185* (2013.01); *H04N 9/3191* (2013.01)
(58) Field of Classification Search
CPC ..... H04N 9/3185; G06T 3/005; G06T 3/0093; G06T 5/006; G06T 3/40; G03B 21/147; G06F 3/0482; G06F 3/0484; G06F 3/04842; G06F 3/04847; G06F 3/0486; G06F 3/04845; G06F 3/04
See application file for complete search history.

(56) References Cited

U.S. PATENT DOCUMENTS

| | | | |
|---|---|---|---|
| 2004/0061838 A1* | 4/2004 | Mochizuki | H04N 5/74 353/69 |
| 2020/0077061 A1 | 3/2020 | Ota et al. | |
| 2022/0132071 A1* | 4/2022 | Tanaka | G03B 21/142 |

FOREIGN PATENT DOCUMENTS

JP    2021-044813 A    3/2021

* cited by examiner

*Primary Examiner* — John W Miller
*Assistant Examiner* — Humam M Satti
(74) *Attorney, Agent, or Firm* — Oliff PLC (57) ABSTRACT

A projector has a projection optical system including a projection lens and a processing device. The processing device makes the projection optical system project a correction image having a rectangular shape. The number of correction points arranged on a first side out of two sides connecting to a vertex located the farthest from the projection lens when projected on a projection surface out of four vertexes of the correction image is larger than the number of correction points arranged on a side different from the two sides. The processing device receives an operation of moving first correction point included in the correction points arranged on the first side, and makes the projection optical system project an output image obtained by applying a distortion correction based on the operation to an input image.

6 Claims, 6 Drawing Sheets

METHOD OF CONTROLLING PROJECTOR AND PROJECTOR

The present application is based on, and claims priority from JP Application Serial Number 2021-160691, filed Sep. 30, 2021, the disclosure of which is hereby incorporated by reference herein in its entirety.

BACKGROUND

1. Technical Field

The present disclosure relates to a method of controlling a projector, and a projector.

2. Related Art

When projection light from a projector obliquely enters a projection surface to be a projection destination of an input image, an output image showing up on the projection surface is trapezoidally distorted. The state in which the projection light from the projector obliquely enters the projection surface means a state in which a normal line of the projection surface and an optical axis of the projector are intersected with each other. In a related-art projector, by projecting a correction image having correction points arranged in a grid-like pattern on the projection surface, and then moving each of these correction points arranged in a grid-like pattern, it is possible to correct a distortion caused by the fact that the projection light from the projector obliquely enters the projection surface (e.g., JP-A-2021-44813 (Document 1)).

Besides when the projection light from the projector obliquely enters the projection surface, when a recess or a projection exists on the projection surface, a distortion occurs in the output image. In recent years, there has been proposed an ultra short focus projector capable of projecting a large image in a short projection distance, and in such an ultra short focus projector, the distortion in the output image caused by the recess or the projection on the projection surface becomes conspicuous in some cases. As in Document 1, when arranging a large number of correction points throughout the entire correction image, namely when increasing the density of the correction points in the correction image, it becomes possible to arrange the correction points at a position of the recess or the projection on the projection surface, and thus, it becomes possible to correct the distortion of the output image. However, the larger the number of the correction points arranged in the correction image becomes, the more the trouble and the time required for the correction increase, and the more cumbersome the correction operation becomes.

SUMMARY

A method of controlling a projector according to the present disclosure includes projecting a correction image on a projection surface, the correction image including a larger number of correction points arranged on a first side as one of two sides of the correction image touching a vertex located farthest from a projection lens when projected on the projection surface out of four vertexes of the correction image having a rectangular shape to be projected on the projection surface from the projector than a number of correction points arranged on a second side different from the two sides, receiving an operation of moving a first correction point included in the correction points arranged on the first side, and projecting an output image obtained by applying a distortion correction based on the operation to an input image on the projection surface.

A projector according to the present disclosure includes a projection optical system including a projection lens, and a processing device. The processing device is configured to execute making the projection optical system project a correction image including a larger number of correction points arranged on a first side as one of two sides of the correction image touching a vertex located farthest from the projection lens when projected on the projection surface out of four vertexes of the correction image having a rectangular shape to be projected on the projection surface from the projection optical system than a number of correction points arranged on a second side different from the two sides, receiving an operation of moving a first correction point included in the correction points arranged on the first side, and making the projection optical system project an output image obtained by applying a distortion correction based on the operation to an input image.

DESCRIPTION OF AN EXEMPLARY EMBODIMENT

An embodiment of the present disclosure will hereinafter be described with reference to the drawings. The embodiment described hereinafter is provided with a variety of technically preferable limitations. However, the embodiment of the present disclosure is not limited to an aspect described below.

1. Embodiment

Figure 1:
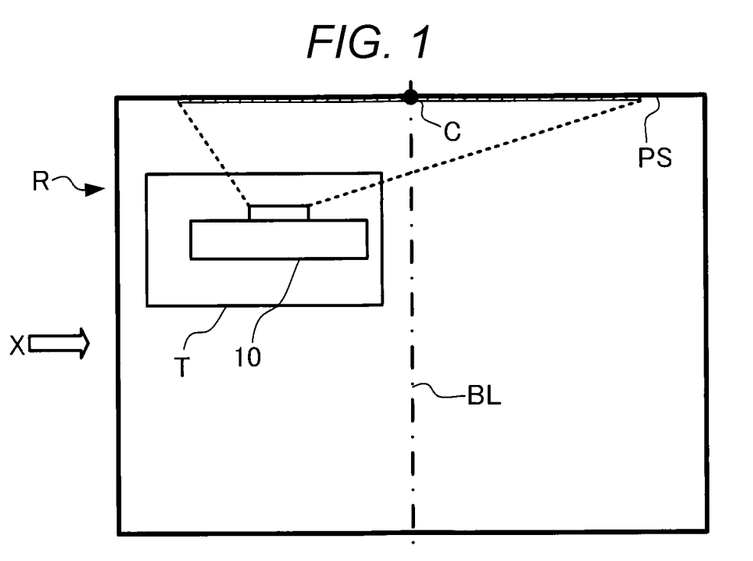
FIG. 1 is a diagram showing an arrangement example of a projector 10 according to an embodiment of the present disclosure to a projection surface PS.
Figure 2:
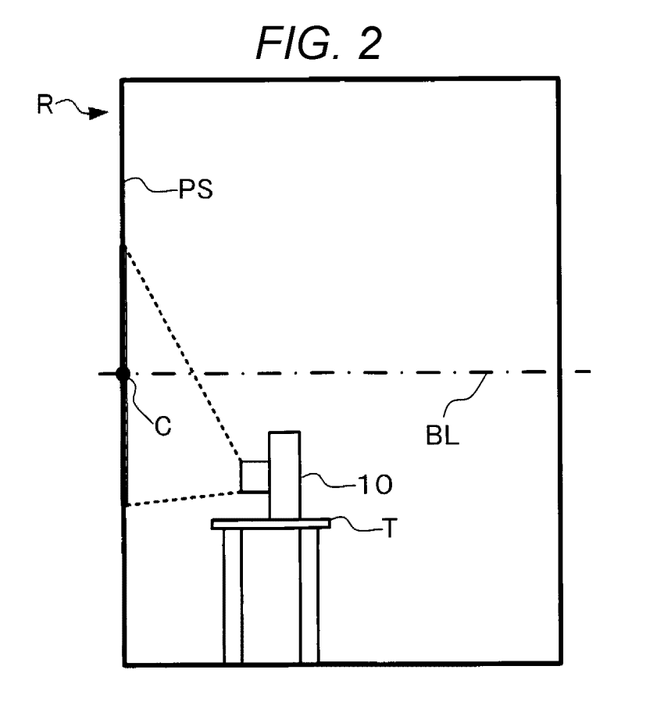
FIG. 2 is a diagram showing an arrangement example of the projector 10 to the projection surface PS.

FIG. 1 and FIG. 2 are each a diagram showing an arrangement example of a projector 10 according to an embodiment of the present disclosure to the projection surface PS. In more detailed description, FIG. 1 is a transparent view of a room R viewed from a ceiling direction wherein the projector 10 is installed in the room R. FIG. 2 is a transparent view of the room R viewed from a direction represented by an arrow X in FIG. 1. As shown in FIG. 1 and FIG. 2, in the present embodiment, one of the wall surfaces of the room R is used as the projection surface PS.

The projector 10 according to the present embodiment is an ultra short focus projector. As shown in FIG. 1 and FIG. 2, the projector 10 is arranged on a table T disposed in the vicinity of a wall surface to be the projection surface PS. In more detailed description, the projector 10 is arranged at a left side and a lower side of a reference line BL as shown in FIG. 1 and FIG. 2. The reference line BL is a normal line of a wall surface to be the projection surface PS passing through the center C of the wall surface. In the present embodiment, the projector 10 is arranged in the room R in a posture in which the optical axis is directed to the center C. In other words, in the present embodiment, the projection light projected toward the projection surface PS from the projector 10 enters the projection surface PS obliquely from the lower left side.

The projection surface PS in the present embodiment is one of the wall surfaces of the room R, and is not flat unlike the projection screen. In other words, on the projection surface PS, there is a recess or a projection in some locations. When projecting an image on such an uneven projection surface PS from a related-art ultra short focus projector, there occurs a distortion caused by the recess or the projection on the projection surface PS. The projector 10 according to the present embodiment is configured so as to be able to easily perform a correction of a distortion caused by the recess or the projection on the projection surface PS in addition to a correction of a keystone distortion caused by the projection light from the projector 10 obliquely entering the projection surface PS.

Figure 3:
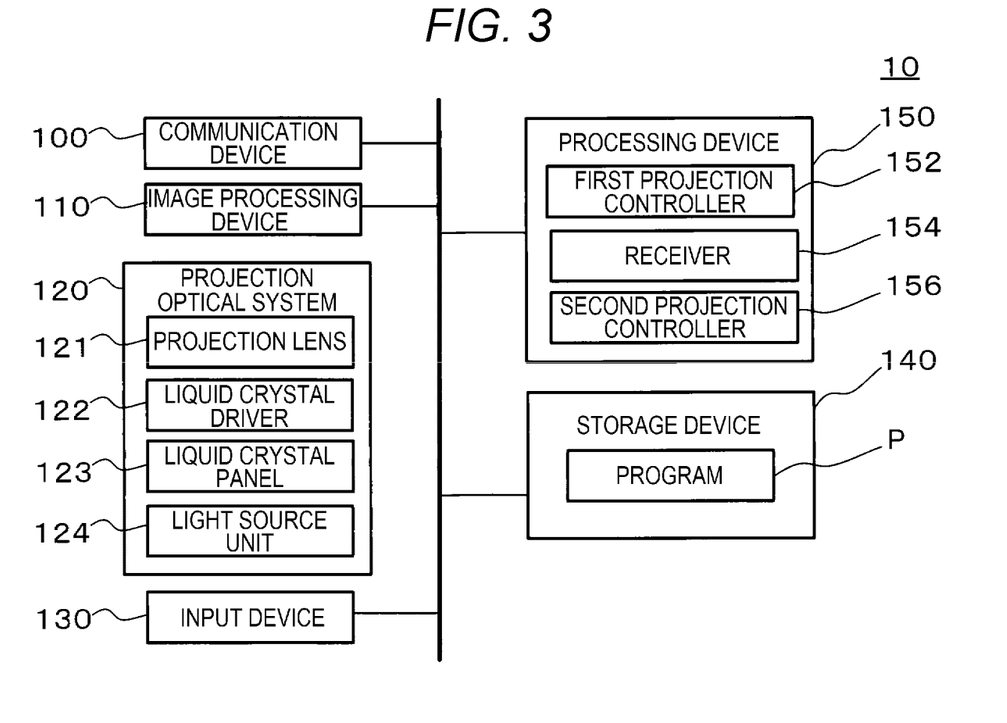
FIG. 3 is a diagram showing a configuration example of the projector 10.

FIG. 3 is a diagram showing a configuration example of the projector 10. As shown in FIG. 3, the projector 10 has a communication device 100, an image processing device 110, a projection optical system 120, an input device 130, a storage device 140, and a processing device 150.

The communication device 100 is a device for communicating with other devices via a communication network such as a wired LAN (Local Area Network) or a wireless LAN. As a specific example of the communication device 100 in the aspect of performing the communication with other devices via the wired LAN, there can be cited NIC (Network Interface Card) coupled to the wired LAN via a LAN cable. Further, as a specific example of the communication device 100 in the aspect of communicating with other devices via the wireless LAN, there can be cited an antenna for receiving a communication radio wave in the wireless LAN, and a circuit for performing modulation and demodulation of the communication radio wave. As the specific example of other devices communicating with the communication device 100 via a communication network, there can be cited an image supply device for transmitting image data, which represents an image to be projected on the projection surface PS from the projector 10, to the projector 10. The image data to be transmitted from the image supply device to the projector 10 is hereinafter referred to as input image data. Further, the image represented by the input image data is referred to as an input image. The communication device 100 receives the input image data transmitted from the image supply device via the communication network. The communication device 100 outputs the input image data thus received to the image processing device 110.

In the present embodiment, there is described when the communication device 100 communicates with other devices via the wired LAN, but this is not a limitation. For example, the communication device 100 can be compliant with USB (Universal Serial Bus) or HDMI (High-Definition Multimedia Interface). It should be noted that HDMI is a registered trademark.

The image processing device 110 is a device for performing image processing such as a distortion correction on the input image data output from the communication device 100. In this distortion correction, there are included the correction of the keystone distortion caused by the projection light from the projector 10 obliquely entering the projection surface PS, and the correction of the distortion caused by the recess or the projection on the projection surface PS. The image processing device 110 performs the distortion correction in accordance with correction data stored in the storage device 140. The correction data is data defining a content of the distortion correction. Although the details will be described later, the correction data is generated by the processing device 150. The image processing device 110 performs the distortion correction according to the correction data on the input image data to thereby generate corrected image data. The image processing device 110 outputs the corrected image data to the projection optical system 120. The image processing device 110 can also be formed of a single processor. Further, it is possible to adopt a configuration in which a plurality of processors functions as the image processing device 110. The image processing device 110 can be formed of an SoC (System on Chip) integrated with other circuits. It is possible to adopt a configuration in which all of the functions of the image processing device 110 are implemented in hardware, or it is also possible to configure all of the functions of the image processing device 110 using programmable devices.

The projection optical system 120 is a device for projecting the output image represented by the corrected image data output from the image processing device 110 to the projection surface PS. As shown in FIG. 3, the projection optical system 120 includes a projection lens 121, a liquid crystal driver 122, a liquid crystal panel 123, and a light source unit 124. The liquid crystal driver 122 drives the liquid crystal panel 123 in accordance with the corrected image data output from the image processing device 110 to thereby draw the output image represented by the corrected image data on the liquid crystal panel 123. The light source unit 124 includes a light source such as a halogen lamp or a laser diode. The light from the light source unit 124 is modulated pixel by pixel in the liquid crystal panel 123, and is projected on the projection surface PS via the projection lens 121.

The input device 130 has a plurality of operators such as a numerical keypad. When an operation such as holding down is performed on the plurality of operators, the input device 130 provides the processing device 150 with operation content data representing a content of the operation. Thus, the operation content of the user to the input device 130 is transmitted to the processing device 150. The input device 130 can be provided with a configuration in which the operation content data received from an external operation device such as a remote controller is provided to the processing device 150.

The storage device 140 includes a RAM (Random Access Memory) as a volatile storage device and a ROM (Read Only Memory) as a nonvolatile storage device. In the nonvolatile storage device, there is stored a program P for making the processing device 150 execute a control method conspicuously representing the features of the present disclosure. The volatile storage device is used by the processing device 150 as a work area when executing the program P.

Further, in the volatile storage device, there is stored posture information representing the posture of the projection optical system 120 with respect to the projection surface PS. In the present embodiment, the user of the projector 10 inputs the posture information corresponding to the posture of the projector 10 when installing the projector 10 in the room R by an input operation to the input device 130. In the storage device 140, there is stored the posture information input by the input operation to the input device 130. In the present embodiment, the projector 10 is disposed at a left side and a lower side of the reference line BL in the room R in a posture in which the optical axis is directed upper right as shown in FIG. 1 and FIG. 2. Therefore, the projector 10 inputs the posture information representing an upper right-pointing posture by the operation to the input device 130, and this posture information is stored in the storage device 140.

The processing device 150 includes a processor such as a CPU (Central Processing Unit), namely a computer. The processing device 150 can include a single processor, or can also include a plurality of processors. The processing device 150 can also be formed of an SoC integrated with a part or the whole of the storage device 140 or other circuits, or integrated with a part or the whole of the storage device 140 and other circuits. Further, the processing device 150 can also be formed of a combination of a CPU for executing a program and a DSP (Digital Signal Processor) for executing a predetermined arithmetic process. It is also possible to adopt a configuration in which all of the functions of the processing device 150 are implemented in the hardware, or it is also possible to adopt a configuration using programmable devices. Further, it is also possible for the processing device 150 to also function as the image processing device 110. In other words, it is also possible for the processing device 150 to perform the functions of the image processing device 110. Taking power-on of the projector 10 as a trigger, the processing device 150 reads out the program P from the nonvolatile storage device to the volatile storage device, and starts the execution of the program P.

The processing device 150 which is currently operating in accordance with the program P functions as a first projection controller 152, a receiver 154, and a second projection controller 156 shown in FIG. 3. In other words, the first projection controller 152, the receiver 154, and the second projection controller 156 shown in FIG. 3 are software modules which are realized by making the computer operate with the program P. The functions of the first projection controller 152, the receiver 154, and the second projection controller 156 are as follows.

Figure 4:
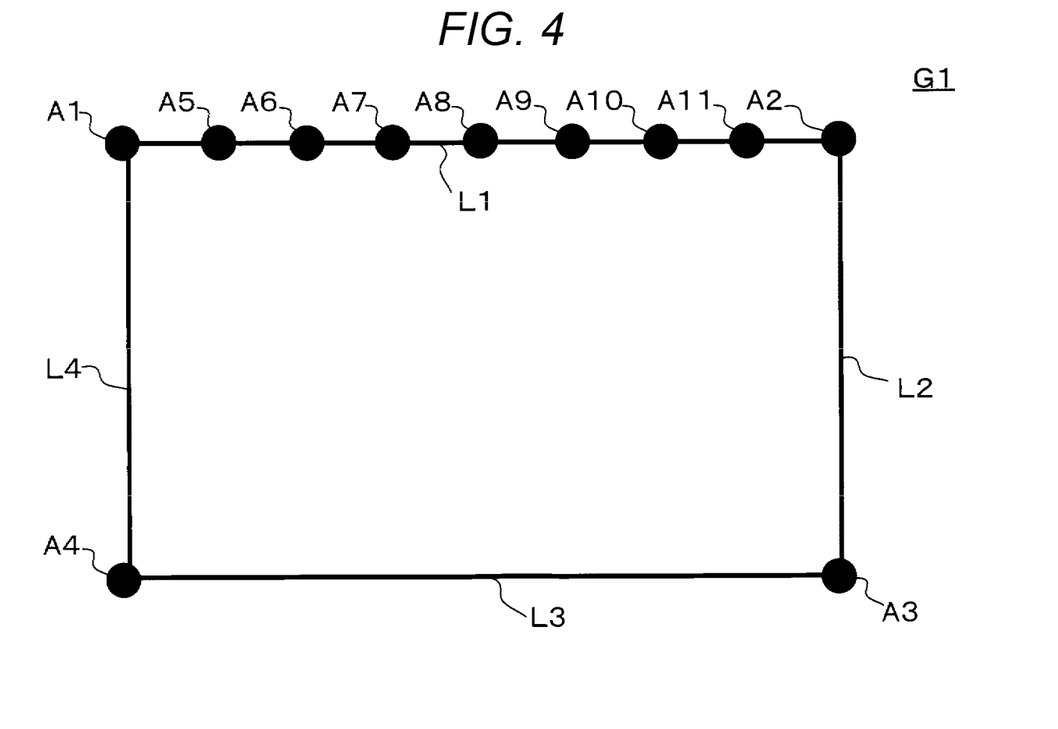
FIG. 4 is a diagram showing an example of a correction image G1 to be projected on the projection surface PS from the projector 10.

When an operation of instructing the distortion correction is performed on the input device 130, the first projection controller 152 makes the projection optical system 120 project the correction image G1 shown in FIG. 4. The correction image G1 is an image for making the user designate the position where the distortion is to be corrected in the output image, and the content of the correction. As shown in FIG. 4, an outline of the correction image G1 is a rectangular shape. In the correction image G1, there is arranged a plurality of correction points for the user to designate the position where the distortion is to be corrected, and the content of the correction. In the present embodiment, there is a feature in a way of arranging the plurality of correction points. A correction image G2 in the distortion correction of a related-art projector will hereinafter be described for the comparison with the present embodiment.

Figure 5:
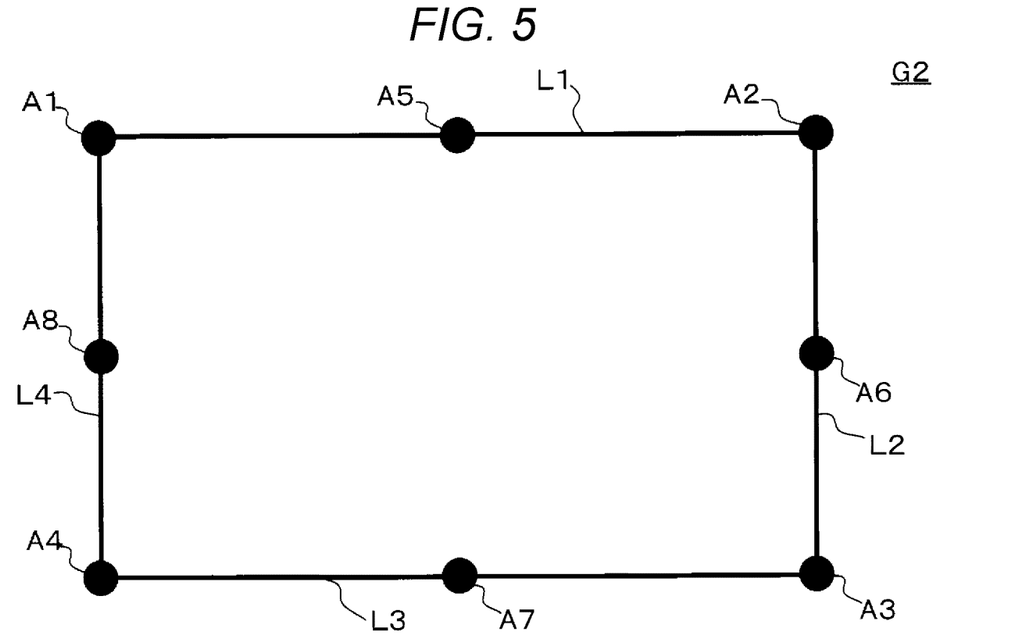
FIG. 5 is a diagram showing an example of a correction image G2 in related art.

FIG. 5 is a diagram showing an example of the correction image G2. The correction image G2 is an image having a rectangular shape similarly to the correction image G1. As shown in FIG. 5, in four corners of the correction image G2, namely four vertexes thereof, there are respectively arranged the correction points A1 through A4 one by one. Further, at the midpoints of the respective four sides of the correction image G2, there are respectively arranged the correction points A5 through A8 one by one. It is possible for the user of the related-art projector to designate the position where the distortion is to be corrected by designating at least one of the correction points A1 through A8. Further, it is possible for the user of the related-art projector to designate a direction of the correction and an amount of the correction, namely the contents of the correction by moving the correction point thus designated.

For example, when the correction image G2, which should properly show up as a rectangular shape, shows up on the projection surface PS with a trapezoidal distortion in which a short side L2 is shorter compared to a short side L4, it is possible for the user of the related-art projector to correct the keystone distortion by moving each of the correction point A2 and the correction point A3 along the short side L2 in a direction from an inside toward an outside of the correction image G2. Specifically, it is possible for the user of the related-art projector to correct the keystone distortion by moving the correction point A2 along the short side L2 in a direction of getting away from the correction point A6, and at the same time, moving the correction point A3 along the short side L2 in a direction of getting away from the correction point A6.

Figure 6:
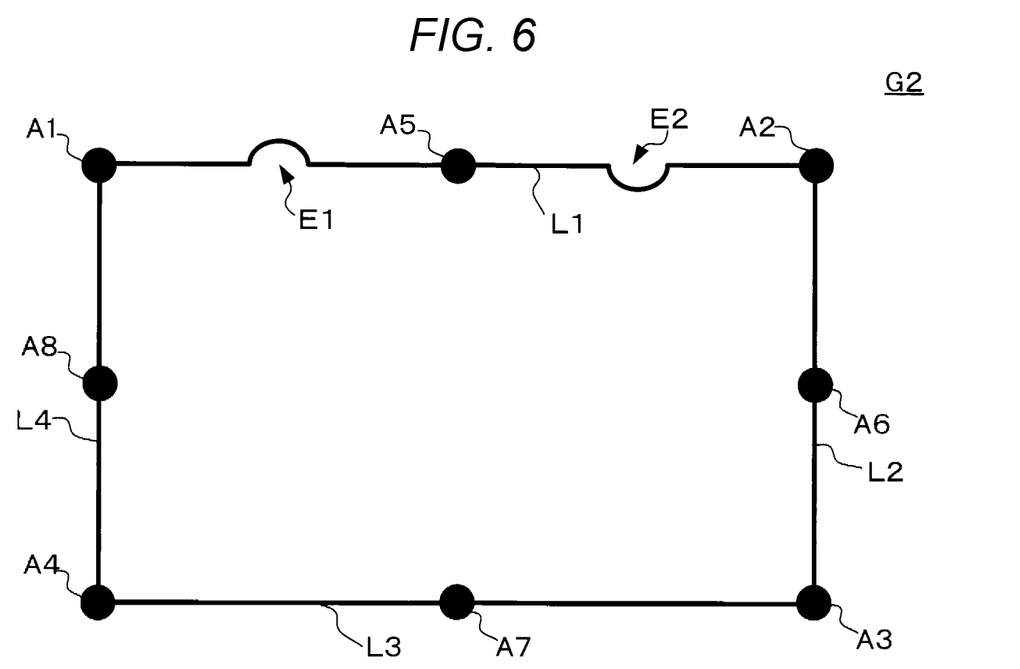
FIG. 6 is a diagram for explaining a problematic point in a distortion correction of the related art using the correction image G2.

In such a manner, in the case of the keystone distortion, it is possible to easily correct the distortion also in the related-art projector. However, when a distortion E1 caused by a recess on the projection surface PS exists in a zone from the correction point A1 to the correction point A5 on the long side L1 of the correction image G2, and at the same time, a distortion E2 caused by a projection on the projection surface PS exists in a zone from the correction point A5 to the correction point A2 as shown in FIG. 6, it is unachievable for the related-art projector to correct the distortion E1 and the distortion E2. This is because there is no correction point at the positions of the distortion E1 and the distortion E2 in the correction image G2. By increasing the number of the correction points arranged in the correction image G2, it becomes possible to correct these distortions. However, it is unachievable to figure out in advance where in the correction image G2 the distortion caused by the recess or the projection of the projection surface PS occurs. Therefore, in order to make it possible to correct the distortion caused by the recess or the projection of the projection surface PS in the related-art projector, it becomes necessary to dispose to evenly arrange a number of correction points throughout the entire correction image G2, and there is a problem that the trouble and the time necessary for the correction increase.

In the present embodiment, the first projection controller 152 respectively arranges the correction points A1 through A4 at the four vertexes of the correction image G1. In this point, the present embodiment is substantially the same as the related-art projector. In the present embodiment, in addition to the correction points A1 through A4, correction points A5 through A11 are arranged in the correction image G1 in the following manner as shown in FIG. 4. In more detailed description, the first projection controller 152, first, identifies a vertex located the farthest from the projection lens 121 when projected on the projection surface PS out of the four vertexes of the correction image G1 with reference to the posture information. Then, the first projection controller 152 arranges the correction points A5 through A11 on a long side out of two sides touching the vertex thus identified. This is because the distortion caused by the recess or the projection of the projection surface PS is more apt to occur on the two sides touching the vertex located the farthest from the projection lens 121 than on the two sides not touching that vertex, and a distortion on a long side is easier to notice than a distortion on a short side. The long side touching the vertex located the farthest from the projection lens 121 when being projected on the projection surface PS in the correction image G1 is an example of a first side in the present disclosure. The long side not touching the vertex located the farthest from the projection lens 121 and the short sides are each an example of a second side in the present disclosure.

When the posture information represents an upper right-pointing posture, the vertex located the farthest from the projection lens 121 when projected on the projection surface PS out of the four vertexes of the correction image G1 is an upper right vertex. When the posture information represents a lower right-pointing posture, the vertex located the farthest is a lower right vertex. When the posture information represents an upper left-pointing posture, the vertex located the farthest is an upper left vertex. When the posture information represents a lower left-pointing posture, the vertex located the farthest is a lower left vertex. In the present embodiment, since the posture information stored in the storage device 140 represents the upper right-pointing posture, the first projection controller 152 identifies the upper right vertex as the vertex located the farthest out of the four vertexes of the correction image G1. Then, as shown in FIG. 4, the first projection controller 152 makes the projection optical system 120 project the correction image G1 in which there are arranged the correction points A5 through A11 on the long side L1 touching the vertex located the farthest from the projection lens 121 when projected on the projection surface PS in addition to the correction points A1 through A4 as shown in FIG. 4. As is obvious when referring to FIG. 4, in the present embodiment, the number of the correction points arranged on the long side L1 is larger than the number of the correction points arranged on each of the short side L2, the long side L3, and the short side L4.

Figure 7:
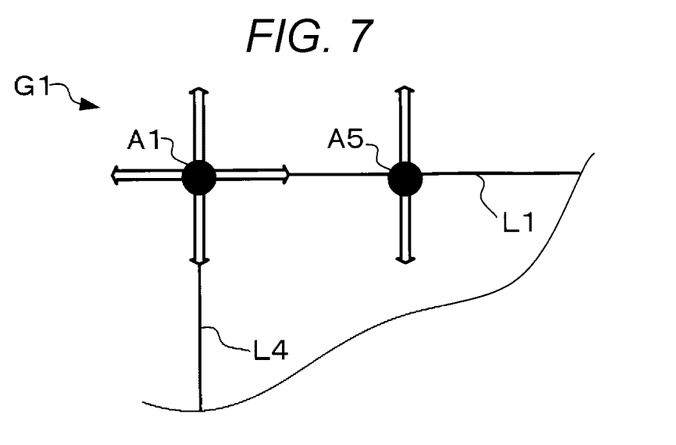
FIG. 7 is a diagram showing an example of directions of movement of correction points in the correction image G1.

It is possible for the user of the projector 10 to designate the position where the distortion is to be corrected by designating at least one of the correction points A1 through A11 using an operation to the input device 130. The correction point designated by the user out of the correction points A1 through A11 is an example of a first correction point in the present disclosure. It is possible for the user of the projector 10 to designate the direction of the correction and the amount of the correction by moving the correction point thus designated using the operation to the input device 130. FIG. 7 is a diagram for explaining directions in which correction point can move. FIG. 7 is a diagram indicating directions in which correction point can move by block arrows. As shown in FIG. 7, in the case of the correction point A1 located at the upper left vertex of the correction image G1, it is possible for the user to move the correction point A1 along an axis perpendicular to the long side L1 in a direction from the inside of the correction image G1 toward the outside thereof or an opposite direction, and along an axis perpendicular to the short side L4 in a direction from the inside of the correction image G1 toward the outside thereof or an opposite direction. The same applies to each of the correction points A2 through A4. In contrast, regarding the correction points arranged at positions different from the vertexes such as the correction points A5 through A11, it is possible for the user to move the correction point along an axis perpendicular to the side on which the correction point is arranged in a direction from the inside of the correction image G1 toward the outside thereof or an opposite direction. With respect to each of the correction points A5 through A11, the direction from the inside of the correction image G1 toward the outside thereof, and perpendicular to the long side L1 is hereinafter referred to as an upward direction. The same applies to the correction point A1 and the correction point A2. Further, with respect to each of the correction points A5 through A11, the direction from the outside of the correction image G1 toward the inside thereof, and perpendicular to the long side L1 is referred to as a downward direction. The same applies to the correction point A1 and the correction point A2. It should be noted that in FIG. 7, the directions in which the correction point A5 can move are indicated by block arrows.

Figure 8:
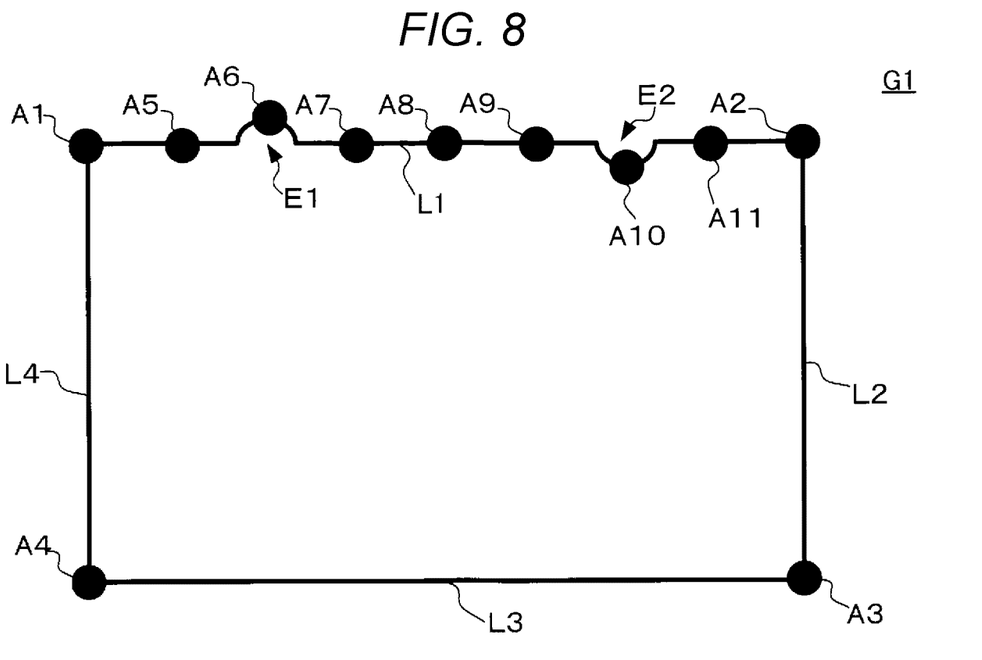
FIG. 8 is a diagram for explaining advantages of the present embodiment.

For example, it is assumed that the distortion E1 and the distortion E2 have occurred on the long side L1 of the correction image G1 showing up on the projection surface PS as shown in FIG. 8 due to the recess or the projection on the projection surface PS. In this case, it is possible for the user of the projector 10 to correct the distortion E1 by designating the correction point A6 located at the position where the distortion E1 has occurred, and then moving the correction point A6 in an opposite direction to the distortion direction of the distortion E1, namely the downward direction, with an amount of movement corresponding to the magnitude of the distortion. Further, it is possible for the user of the projector 10 to correct the distortion E2 by designating the correction point A10 located at the position where the distortion E2 has occurred, and then moving the correction point A10 in an opposite direction to the distortion direction of the distortion E2, namely the upward direction, with an amount of movement corresponding to the magnitude of the distortion.

Figure 9:
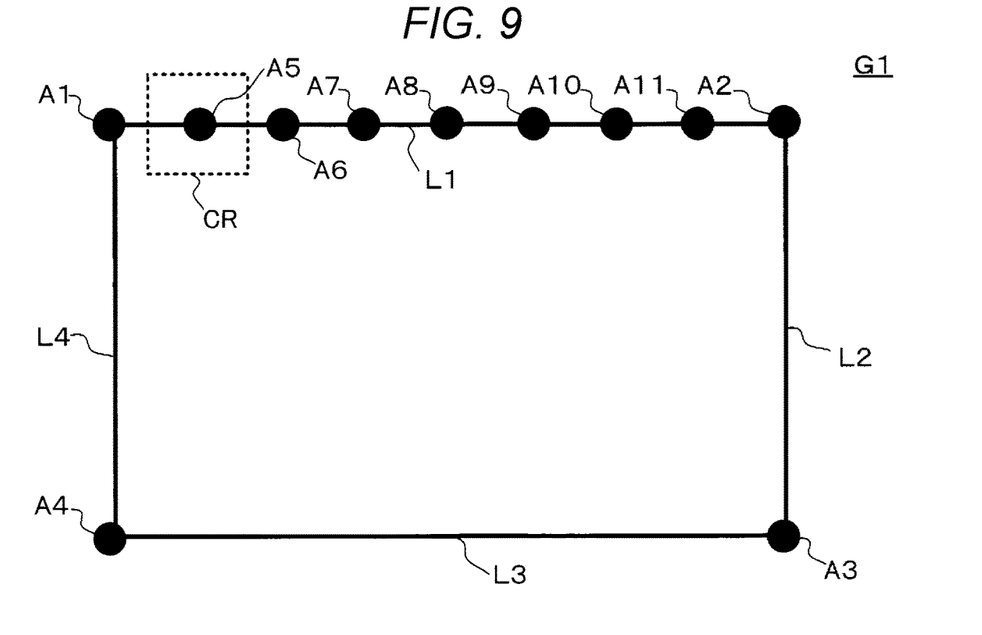
FIG. 9 is a diagram showing a display example of a cursor CR for receiving designation of the correction point.

The receiver 154 receives a designation operation of designating each of the correction points A1 through A11, and a movement operation of moving the correction point thus designated via the input device 130. In more detailed description, the receiver 154 executes the following processing every time the receiver 154 receives the operation content data indicating a start of the correction from the input device 130. The receiver 154 first makes the projection optical system 120 project a cursor CR for designating and then moving each of the correction points A1 through A11 on the correction image G1 as shown in FIG. 9. When the receiver 154 receives the operation content data representing the operation of moving the cursor CR from the input device 130, the receiver 154 moves the cursor CR in accordance with the operation represented by the operation content data thus received. When the receiver 154 receives the operation content data representing the operation of determining the position of the cursor CR from the input device 130, the receiver 154 determines the correction point at which the cursor CR is located at the moment when the receiver 154 receives the operation content data as the correction point as the operation target, and then deletes the cursor CR. Then, when the receiver 154 receives the operation content data representing the movement operation to the correction point as the operation target from the input device 130, the receiver 154 identifies the direction of the movement and the amount of the movement in accordance with the operation content data, and then moves the correction point as the operation target in the direction of the movement thus identified with the amount of the movement thus identified.

Then, when the receiver 154 receives the operation content data representing completion of the correction from the input device 130, the receiver 154 generates the correction data representing the correction point as the operation target, the direction of the movement and the amount of the movement of the correction point, and then stores the correction data in the storage device 140.

The second projection controller 156 retrieves the correction data stored in the storage device 140 and then provides the correction data to the image processing device 110. Subsequently, the image processing device 110 performs the distortion correction corresponding to the correction data on the input image data provided from the communication device 100, and then provides the projection optical system 120 with the corrected image data representing the input image in which the distortion has been corrected. Thus, the output image obtained by applying the distortion correction to the input image is projected from the projection optical system 120 to the projection surface PS.

Figure 10:
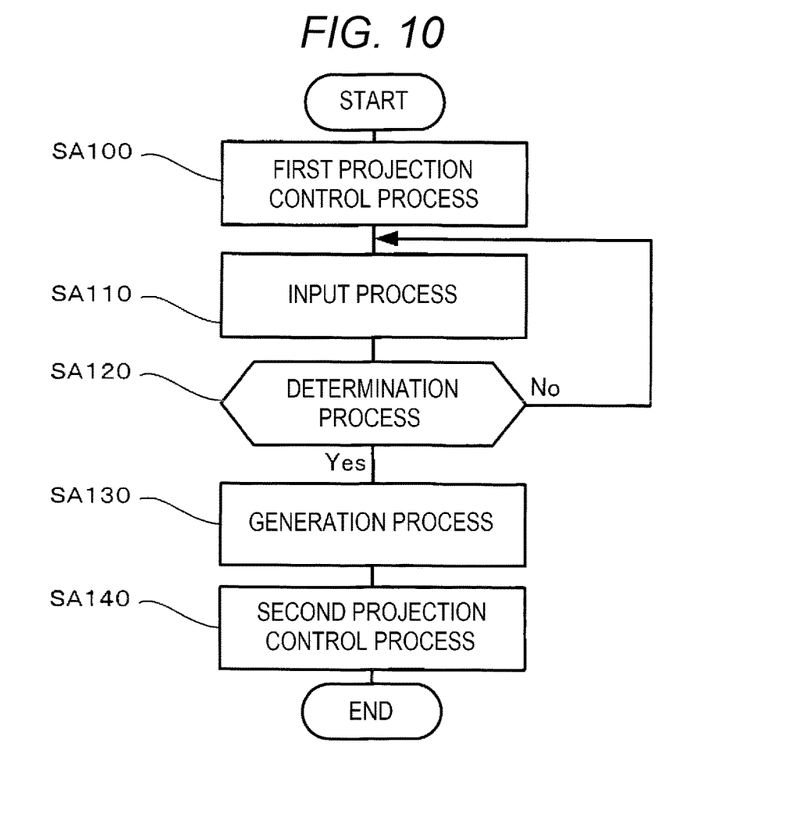
FIG. 10 is a flowchart showing a flow of a control method to be executed by a processing device 150 in accordance with a program P.

Further, the processing device 150 which is operating in accordance with the program P executes a control method conspicuously representing features of the present disclosure. FIG. 10 is a flowchart showing a flow of this control method. As shown in FIG. 10, this control method includes a first projection control process SA100, an input process SA110, a determination process SA 120, a generation process SA130, and a second projection control process SA140. Processing contents of the first projection control process SA100, the input process SA110, the determination process SA120, the generation process SA130, and the second projection control process SA140 are as follows.

In the first projection control process SA100, the processing device 150 functions as the first projection controller 152. In the first projection control process SA100, the processing device 150 makes the projection optical system 120 project the correction image G1.

In the input process SA110, the determination process SA120, and the generation process SA130, the processing device 150 functions as the receiver 154. In the input process SA110, the processing device 150 receives the designation operation of designating any one of the correction points A1 through A11 as the correction point as the operation target, and a movement operation of moving the correction point designated by the designation operation via the input device 130. In the determination process SA120, the processing device 150 determines whether or not an operation of instructing the completion of the correction has been performed on the input device 130. As shown in FIG. 10, when the determination result in the determination process SA120 is "No," the processing device 150 executes the processing in the input process SA110 and the subsequent processes once again. When the determination result in the determination process SA120 is "Yes," the processing device 150 executes the generation process SA130. In the generation process SA130, the processing device 150 generates the correction data, and then stores the correction data thus generated in the storage device 140.

As shown in FIG. 8, when the distortion E1 and the distortion E2 have occurred on the long side L1 of the correction image G1 showing up on the projection surface PS, the user performs the operation of designating the correction point A6 located at the position where the distortion E1 occurs, and moving the correction point A6 in the downward direction. In the input process SA110, the processing device 150 moves the correction point A6 in accordance with the operation by the user. Further, the user performs the operation of designating the correction point A10 located at the position where the distortion E2 occurs, and moving the correction point A10 in the upward direction. In the input process SA110, the processing device 150 moves the correction point A10 in accordance with the operation by the user. Then, when the user performs the operation of instructing the completion of the correction, the determination result in the determination process SA120 becomes "Yes," and the generation process SA130 is executed. In the generation process SA130, the processing device 150 generates the correction data corresponding to the direction of the movement and the amount of the movement of each of the correction point A6 and the correction point A10, and then stores the correction data in the storage device 140.

In the second projection control process SA140, the processing device 150 functions as the second projection controller 156. In the second projection control process SA140, the processing device 150 retrieves the correction data stored in the storage device 140, and then provides the correction data to the image processing device 110. Subsequently, the image processing device 110 performs the distortion correction corresponding to the correction data on the image data provided from the communication device 100 to generate the corrected image data, and then provides the projection optical system 120 with the corrected image data thus generated. Thus, the output image obtained by applying the distortion correction to the input image is projected from the projection optical system 120 to the projection surface PS. Therefore, there is no chance for the distortion caused by the recess on the projection surface PS, namely the distortion corresponding to the distortion E1, and the distortion caused by the projection on the projection surface PS, namely the distortion corresponding to the distortion E2 to show up in the output image.

As described hereinabove, according to the present embodiment, it becomes possible to correct the distortion in the output image caused by the recess or the projection on the projection surface PS without disposing a number of correction points throughout the entire correction image G1. In other words, according to the present embodiment, it becomes possible to correct the distortion in the output image caused by the recess or the projection on the projection surface PS while suppressing the increase in the trouble and the time required for the correction compared to the aspect of disposing a number of correction points throughout the entire correction image G1.

2. Modifications

The embodiment described hereinabove can be modified as follows.

Figure 11:
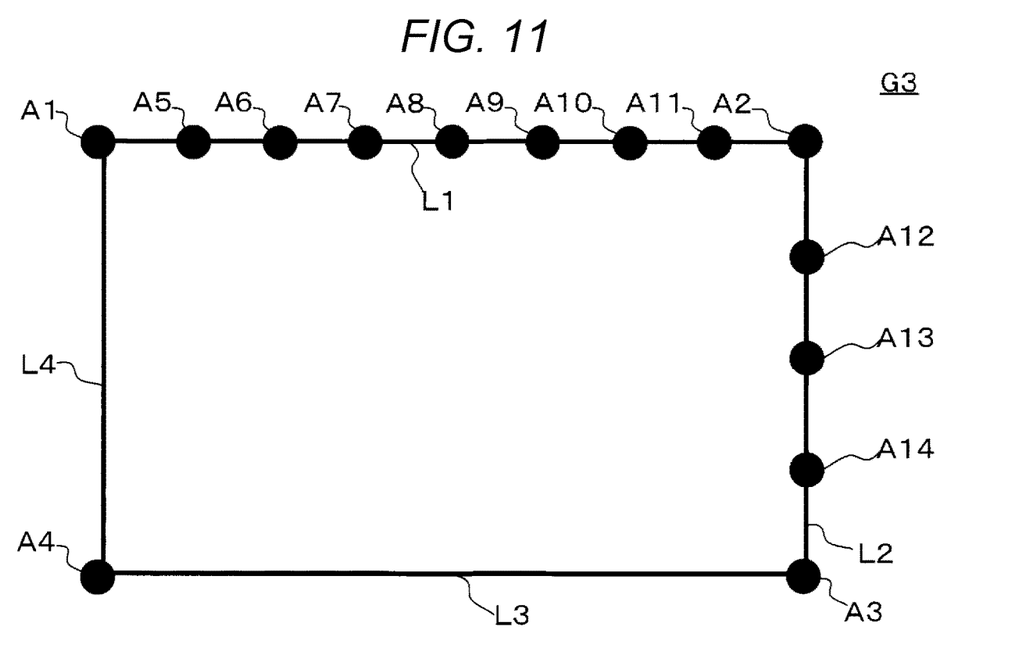
FIG. 11 is a diagram for explaining a modified example (1).

(1) In the embodiment described above, a larger number of correction points are arranged on the long side of the two sides touching the vertex located the farthest from the projection lens 121 when the correction image G1 is projected on the projection surface PS out of the four vertexes of the correction image G1 than on the second side other than the two sides. However, it is also possible for the number of the correction points arranged on a side different from the first side, namely the short side, out of the two sides touching the vertex located the farthest from the projection lens 121 to be larger than the number of correction points arranged on the second side. This is because the distortion caused by the recess or the projection on the projection surface PS is the second-most apt to show up in the short side of the two sides touching the vertex located the farthest from the projection lens 121 after the long side touching the vertex. In the example shown in FIG. 11, the upper right vertex out of the four vertexes of a correction image G3 is the vertex located the farthest from the projection lens 121. As shown in FIG. 11, the long side L1 and the short side L2 touch the upper right vertex of the correction image G3. In the correction image G3 shown in FIG. 11, the correction points A1, A2, and A5 through A11 are arranged on the long side L1, and the correction points A2, A3, and A12 through A14 are arranged on the short side L2. Further, in the correction image G3 shown in FIG. 11, the correction point A3 and the correction point A4 are arranged on the long side L3, and the correction point A1 and the correction point A4 are arranged on the short side L4. The long side L1 in FIG. 11 is an example of the first side in the present disclosure. The long side L3 and the short side L4 in FIG. 11 are each an example of the second side in the present disclosure. The short side L2 in FIG. 11 is an example of a third side in the present disclosure. According to the present aspect, it becomes possible to correct the distortion on the third side apt to attract the user's attention while suppressing the increase in the trouble and the time required for the correction compared to the aspect of arranging the same number of the correction points on the third side and the second side.

Figure 12:
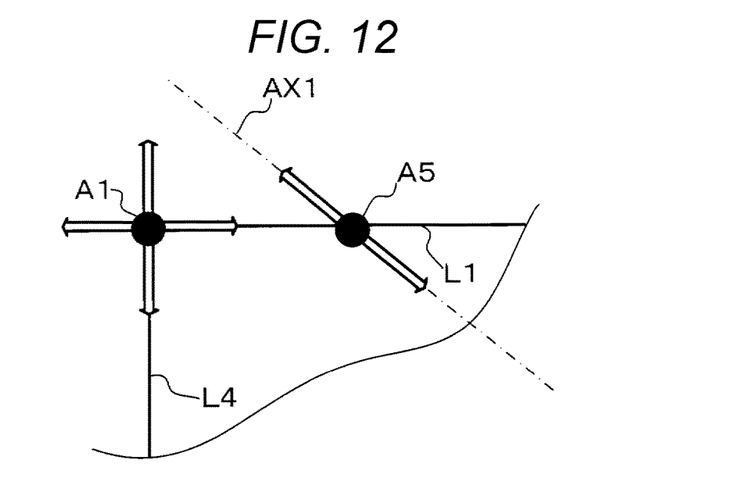
FIG. 12 is a diagram for explaining a modified example (2).

(2) In the embodiment described above, the movement operation to the correction point A5 is the operation of moving the correction point A5 along the axis perpendicular to the long side L1 on which the correction point A5 is located, and the same applies to the movement operation to each of the correction points A6 through A11. However, it is sufficient for the movement operation to the correction point A5 to be the operation of moving the correction point A5 along the axis intersecting the long side L1, and can be an operation of moving the correction point A5 along an axis AX1 passing through the position at which the correction point A5 is disposed on the long side L1 and the center of the correction image G1 as shown in, for example, FIG. 12. The movement operation to each of the correction points A6 through A11 can similarly be the operation of moving correction points An along the axis passing through the position at which the correction point An is disposed on the long side L1 and the center of the correction image G1. It should be noted that n denotes any one of integers of 6 through 11.

(3) The projector 10 according to the present embodiment is the ultra short focus projector. However, the projector 10 can be a general projector longer in projection distance necessary when projecting a large image than the ultra short focus projector. Even when the projector 10 is the general projector, by making the projector 10 execute the control method according to the present disclosure, it becomes possible to correct the distortion in the output image caused by the recess or the projection on the projection surface PS while suppressing the increase in the trouble and the time required for the correction.

(4) The first projection controller 152, the receiver 154, and the second projection controller 156 are the software modules in the embodiment described above, but can also be hardware modules such as an ASIC (Application Specific Integrated Circuit). Further, the three processes of the input process SA110, the determination process SA120, and the generation process SA130 in the embodiment described above can collectively be referred to as a reception process. Although in the embodiment described above, the program P for making the processing device 150 execute the first projection control process SA100, the reception process, and the second projection control process SA140 is stored in advance in the storage device 140, the program P can be manufactured alone, and can also be distributed with or without compensation. As a specific method of distributing the program P, there is conceived an aspect of writing the program P in a computer-readable recording medium such as a flash ROM (Read Only Memory) to distribute the recording medium, or an aspect of distributing the program P by downloading the program P via a telecommunication line such as the Internet. By making a computer in the related-art projector operate with the program P distributed in these aspects, it becomes possible to make the related-art projector execute the control method according to the present disclosure.

3. Aspects Figured Out from Embodiment and Modified Examples

The present disclosure is not limited to the embodiment and the modified examples described above, but can be implemented in a variety of aspects within the scope or the spirit of the present disclosure. For example, the present disclosure can also be implemented in the following aspects. The technical features in the embodiment described above corresponding to the technical features in each of the aspects described below can arbitrarily be replaced or combined in order to solve apart or the whole of the problem of the present disclosure, or to achieve some or all of the advantages of the present disclosure. Further, the technical feature can arbitrarily be eliminated unless described in the present specification as an essential element.

An aspect of the method of controlling the projector according to the present disclosure includes the first projection control process, the reception process, and the second projection control process described below. The first projection control process is processing of projecting the correction image having a rectangular shape on the projection surface. The number of the correction points arranged on the first side as one of the two sides of the correction image touching the vertex located the farthest from the projection lens when projected on the projection surface out of the four vertexes of the correction image is larger than the number of the correction points arranged on the second side different from the two sides. The reception process is processing of receiving the operation of moving the first correction point included in the correction points arranged on the first side. The second projection control process is processing of projecting the output image obtained by applying the distortion correction based on the operation received in the reception process to the input image on the projection surface. According to the control method of the present aspect, since the larger number of correction points are arranged on the first side than on the second side, it becomes possible to more finely correct the distortion on the first side caused by the recess or the projection on the projection surface than the distortion on the second side. The first side is one of the two sides touching the vertex located the farthest from the projection lens when projected on the projection surface out of the four vertexes of the correction image having the rectangular shape. The distortion on the first side caused by the recess or the projection on the projection surface is more significant and more conspicuous than the distortion on the second side. According to the present aspect, it becomes possible to correct the distortion on the first side apt to be conspicuous while suppressing the increase in the trouble and the time required for the correction compared to the aspect of arranging the same number of the correction points on the first side and the second side.

In the control method according to a more preferable aspect, the operation to be received in the reception process can be an operation of moving the first correction point along the axis crossing the first side. According to the present aspect, it becomes possible to correct the distortion of the first side in the direction along the axis crossing the first side.

The first projection control process in the control method according to another preferable aspect can include arranging a larger number of correction points on the third side different from the first side out of the two sides than on the second side. According to the present aspect, it becomes possible to correct the distortion on the third side apt to attract the user's attention while suppressing the increase in the trouble and the time required for the correction compared to the aspect of arranging the same number of the correction points on the third side and the second side.

Further, an aspect of the projector according to the present disclosure includes the projection optical system including the projection lens, and the processing device. The processing device executes the first projection control process of projecting the correction image from the projection optical system to the projection surface, the reception process, and the second projection control process. According also to the present aspect, it becomes possible to correct the distortion on the first side apt to attract the user's attention while suppressing the increase in the trouble and the time required for the correction compared to the aspect of arranging the same number of the correction points on the first side and the second side.

What is claimed is:

1. A method of controlling a projector comprising:
projecting a correction image having a rectangular shape on a projection surface from a projector, the rectangular shape having four vertexes at different distances from a projection lens of the projector when projected on the projection surface, the correction image including
a first side which is one of two sides of the correction image forming a vertex located farthest from the projection lens out of the four vertexes of the correction image, and
correction points arranged on the first side, a number of the correction points arranged on the first side being larger than a number of correction points arranged on a second side that is different from the two sides and that does not form the vertex located farthest from the projection lens;
receiving an operation of moving a first correction point included in the correction points arranged on the first side; and
projecting an output image obtained by applying a distortion correction based on the operation to an input image on the projection surface.

2. The method according to claim 1, wherein
the operation is an operation of moving the first correction point along an axis crossing the first side.

3. The method according to claim 1, wherein
in the correction image, a number of the correction points arranged on a third side out of the two sides, the third side being different from the first side, is larger than a number of the correction points arranged on the second side.

4. A projector comprising:
a projection optical system including a projection lens; and
a processing device programmed to execute
projecting a correction image having a rectangular shape on a projection surface from using the projection optical system, the rectangular shape having four vertexes at different distances from the projection lens of the projector when projected on the projection surface, the correction image including
a first side which is one of two sides of the correction image forming a vertex located farthest from the projection lens out of the four vertexes of the correction image, and
correction points arranged on the first side, a number of the correction points arranged on the first side being larger than a number of correction points arranged on a second side that is different from the two sides and that does not form the vertex located farthest from the projection lens,
receiving an operation of moving a first correction point included in the correction points arranged on the first side, and
projecting, using the projection optical system, an output image obtained by applying a distortion correction based on the operation to an input image.

5. The projector according to claim 4, wherein
the operation is an operation of moving the first correction point along an axis crossing the first side.

6. The projector according to claim 4, wherein
in the correction image, a number of the correction points arranged on a third side out of the two sides, the third side being different from the first side, is larger than a number of the correction points arranged on the second side.

* * * * *